_UNITED STATES PATENT OFFICE_

2,776,298

SUBSTITUTED DITHIOLANYL ALIPHATIC ACIDS AND DERIVATIVES

Milon W. Bullock, Pearl River, N. Y., assignor to American Cyanamid Company, New York, N. Y., a corporation of Maine No Drawing. Application January 24, 1955, Serial No. 483,830

3 Claims. (Cl. 260—327)

This invention relates to the preparation of substituted dithiolanyl aliphatic acids and salts and esters thereof.

In my copending application, Serial Number 387,043, filed October 19, 1953, of which the present application is a continuation-in-part, I described and claimed the preparation of intermediates useful in the preparation of thioctic acid, compounds of the present invention and related compounds. Thioctic acid has been described as an oxidation inhibitor and a growth supporting factor for microorganisms such as *S. facelis, Tetrahymena geleii* and some Corynebacterium species. Thioctic acid has also been described by F. Rausch, 60th Session of the German Association for Internal Medicine, Munich, April 1954, as being useful in the treatment of hepatic coma and related diseases.

It has now been found that a lower alkyl substituted thioctic acid, 6,8-dithiononanoic acid, has unexpected biological properties in that it is effective as a competitive antagonist to thioctic acid which is required in the growth of *Tetrahymena geleii* and species of Corynebacterium and which greatly accelerates the growth rate of certain other microorganisms such as *Streptococcus facelis*. In addition to inhibiting the growth of *Streptococcus facelis, Tetrahymena geleii* and species of the Corynebacterium when grown in the presence of thioctic acid, the lower alkyl substituted thioctic acids such as 6,8-dithiononanoic acid also inhibits the enzymatic decarboxylation of the alpha-ketoacids such as alpha-ketoglutaric acid and pyruvic acid in the biological system such as that described by I. C. Gunsalus et al., Journal of Biological Chemistry, 194, page 849 (1952). The alkyl substituted thioctic acids therefore are useful in controlling the biological activity of thioctic acid and because of the biological activity which they themselves possess as antagonists.

The new compounds of the present invention may be illustrated by the following structural formula:

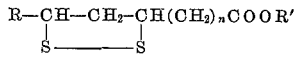

in which R is a lower alkyl radical, R' is hydrogen, a lower alkyl radical or an alkali metal radical and $n$ is a whole integer of 2 to 6. Since the compounds contain a carboxylic acid group, they will form esters (indicated by R' above) such as methyl, ethyl propyl, butyl, etc.

The compounds of the present invention are, in general, solids at room temperature, they are immiscible with water and soluble or miscible, in general, with organic solvents such as benzene, chloroform, ether, etc. In general, they are low melting solids which in some cases may be in the form of oils.

To prepare the compounds of the present invention it is preferred that the dithiol acids such as, for example, 6,8-dithiolnonanoic acid, 6,8-dithioldecanoic acid, 5,7-dithioloctanoic acid, 5,7-dithiolnonanoic acid, 4,6-dithiolheptanoic acid, 4,6-dithioloctanoic acid and the like are dissolved in an aqueous alkaline media. The reaction mixture is then treated with an oxidizing agent such as iodine or oxygen itself. It may be desirable to have present a catalyst or indicator such as ferric chloride which will show when the solution is completely oxidized by the absence of color. The reaction is usually conducted at room temperature, although it may be conducted at a temperature within the range of 0° to 100° C. Following completion of the oxidation the aqueous solution is then acidified with a mineral acid and the desired product extracted with an organic solvent such as diethyl ether. The product can then be further purified by removal of the ether and distillation. Still further purification can usually be obtained by recrystallization of the product from organic solvents such as petroleum ether.

The following example illustrates in greater particularity the preparation of the compounds of the present invention.

Ethyl 8 - acetylthio - 6 - hydroxynonanoate, 26.6 g. (0.0963 mole), was saponified by refluxing 40 minutes with a solution of 8.5 g. (0.212 mole) sodium hydroxide in 100 ml. water. The solution was cooled, acidified and extracted with two 100 ml. portions of ether. The combined ether extracts were dried over sodium sulfate and distilled leaving 27 g. of a colorless viscous oil. This oil was treated with 75 g. thiourea followed by 200 g. 50% hydriodic acid. The resulting solution was heated at reflux 18 hours. The solution was cooled and made alkaline with 5 N sodium hydroxide. The alkaline solution was refluxed 40 minutes, cooled some and acidified with concentrated hydrochloric acid. The aqueous solution was extracted with two 100 ml. portions of chloroform. The combined chloroform extracts were dried over sodium sulfate and distilled. The yellow oily residue was distilled through a 6 inch vacuum jacketed Vigreux column. The fractions were collected as follows:

| No. | Boiling Point | Press. (mm.) | Wt. (g.) | Remarks |
|---|---|---|---|---|
| 1 | 134–144 | 0.18 | 1.7 | |
| 2 | 144–146 | 0.18–0.2 | 4.4 | |
| 3 | 148–158 | 0.2–0.1 | 2.5 | Partially solidified. |
| 4 | 153–166 | 0.1–0.15 | 6.0 | Completely solidified. |
| 5 | 166–166 | 0.15 | 0.9 | Partially solidified. |

Fractions 3 and 5 were combined and the crystals filtered off and washed with a mixture of one-third cyclohexane and two-thirds petroleum ether, boiling point 60°–68° C. The product weighed 0.5 g., melting point 45° C. These crystals were recrystallized from a mixture of 10 ml. of the petroleum ether and 4 ml. of cyclohexane to yield 0.3 g. of yellow crystals, melting point 45°–46° C.

Fraction 4 was crushed in the mother liquors of the above compound and filtered, weight 5.1 g. This product was recrystallized from a mixture of 20 ml. cyclohexane and 100 ml. of petroleum ether, boiling point 60°–68° C., to yield 3.7 g. of yellow crystals, melting point 45°–46° C. The oily fraction from fractions 3 and 5 were combined with the mother liquors and the solvent distilled. The residue weighed 5.8 g. A portion of this oil was saved from bioautographs and the remainder, 5.5 g., was dissolved in 100 ml. of water containing 2.5 g. sodium carbonate. The slightly turbid solution was washed with a small amount of ether which removed the turbidity. Two ml. of 0.1% ferric chloride solution was added and oxygen was bubbled through the solution until the purple color disappeared (10 minutes). The aqueous solution was acidified with concentrated hydrochloric acid and extracted with ether. Distillation of the dried (sodium sulfate) ether solution left an oil which crystallized after a few minutes. The crystals were filtered off and washed with petroleum ether, boiling point 60°–68° C., weight 2.0 g., melting point 52° C. This product was recrystallized from 50 ml. of petroleum ether, boiling point 60°–68° C. to yield 1.3 g. of crystals of 6,8-dithiononanoic acid, melting point 54°–54.5° C. An additional 0.3 g. of product was recovered from the mother liquors.

We claim:

1. A compound having the general formula:

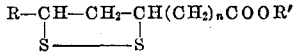

in which R is a lower alkyl radical, R' is a member of the group consisting of hydrogen, lower alkyl and alkali metal radicals and $n$ is a whole integer of 2 to 6.

2. Unsubstituted 8-lower alkyl 6,8-dithiooctanoic acids.
3. The compound 6,8-dithiononanoic acid.

References Cited in the file of this patent

UNITED STATES PATENTS 2,706,158    Searle _____ Apr. 12, 1955

OTHER REFERENCES

Long, Science Progress 41:659–665 (1953).
Autenrieth, Berichte 33:1370–71 (1899).
Hornberger et al.: J. A. C. S., 74:2382 (May 5, 1952).